(12) United States Patent
Peters

(10) Patent No.: US 6,386,039 B1
(45) Date of Patent: May 14, 2002

(54) METHOD AND APPARATUS FOR DETERMINING THE ACOUSTIC SPATIAL CHARACTERISTICS PARTICULARLY OF A VEHICLE OCCUPANT COMPARTMENT IN A MOTOR VEHICLE

(75) Inventor: Mike Peters, Freising (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 09/617,751

(22) Filed: Jul. 17, 2000

(30) Foreign Application Priority Data

Jul. 16, 1999 (DE) .......................................... 199 33 317

(51) Int. Cl.$^7$ ................................................ A61B 5/12
(52) U.S. Cl. ............................ 73/589; 73/585; 73/591; 381/328
(58) Field of Search .................... 73/589, 585, 586, 73/587, 591, 599; 381/103, 56, 58, 60

(56) References Cited

U.S. PATENT DOCUMENTS

| | | | | |
|---|---|---|---|---|
| 4,118,601 A | * | 10/1978 | Yeap ........................ | 381/103 |
| 4,390,748 A | * | 6/1983 | Zwicker ..................... | 73/585 |
| 4,548,082 A | * | 10/1985 | Engebretson et al. ......... | 73/585 |
| 5,428,998 A | * | 7/1995 | Downs ....................... | 73/585 |
| 5,465,469 A | | 11/1995 | Sakai et al. ................ | 29/404 |
| 5,557,683 A | * | 9/1996 | Eubanks ..................... | 381/86 |

FOREIGN PATENT DOCUMENTS

DE       196 47 399 C1       11/1996

\* cited by examiner

*Primary Examiner*—Hezron Williams
*Assistant Examiner*—Jacques M Saint-Surin
(74) *Attorney, Agent, or Firm*—Crowell & Moring LLP

(57) ABSTRACT

The method and apparatus according to the invention determines the acoustic spatial characteristics of an enclosure, particularly of a vehicle occupant compartment in a motor vehicle. A piece of equipment emits a useful sound together with a test sound. By analyzing a recorded analysis sound, the test sound is emitted in a psychoacoustic masking range of the useful sound. Advantageously, the covering range of the useful sound is determined in a useful-sound analysis block before the useful sound and the test sound are emitted.

9 Claims, 1 Drawing Sheet

METHOD AND APPARATUS FOR DETERMINING THE ACOUSTIC SPATIAL CHARACTERISTICS PARTICULARLY OF A VEHICLE OCCUPANT COMPARTMENT IN A MOTOR VEHICLE

BACKGROUND AND SUMMARY OF THE INVENTION

This application claims the priority of German patent document 199 33 317.3, filed Jul. 16, 1999, the disclosure of which is expressly incorporated by reference herein.

The invention relates to a method and an apparatus for determining the acoustic spatial characteristics of an enclosure, particularly of a vehicle occupant compartment in a motor vehicle.

For example, in the case of audio and video receivers for hi-fi playback, methods are known which permit one-time manual or automatic adjustments to be made at the equipment which is playing back the useful sound, for a spatial adaptation. In one known manual adjustment technique, for example, the spatial measurements, the locations of the loudspeakers and/or the reflection condition of the walls can be input to the equipment. In a known automatic adjustment arrangement, a special test sound is emitted when the hi-fi equipment is installed, and the analysis sound then received by means of a microphone, is analyzed to determine the spatial sound parameters. The latter are then correspondingly stored by means of a spatial sound processor, for the playback of a space-adapted useful sound.

When using the known methods in motor vehicles, the problem arises that the spatial acoustics in the vehicle occupant compartment change constantly; for example, as a function of the number and movement of the vehicle occupants, noise-affecting environmental influences (e.g., wind noise), temperature fluctuations, road conditions, or operating parameters of the motor vehicle, (e.g., vehicle speed or rotational engine speed).

Furthermore, methods are known for the active sound compensation by means of digital adaptive filters which, however, usually adapt too slowly to compensate the disturbing noises which often change very rapidly in the vehicle.

It is an object of the invention to optimize the sound quality of acoustic systems in motor vehicles, such as CD and radio playback equipment or handsfree telephone systems, in a simple manner in the sense of a dynamic space adaptation.

This and other objects and advantages are achieved by the method and apparatus according to the invention for determining acoustic spatial characteristics (particularly in a vehicle occupant compartment in a motor vehicle), in which a piece of equipment which normally emits a useful sound (such as music) also emits a test sound, in a psycho-acoustic masking range of the useful sound. Subsequently, the total sound, consisting of the reflected useful sound and the reflected test sound, is recorded as analysis sound. Finally, the reflected test sound fraction of the analysis sound is analyzed (in a known manner) with respect to the acoustic spatial characteristics. Preferably, particularly post-masking in the time domain and/or simultaneous masking in the frequency domain are utilized. Although the utilization of the pre-masking is a possible alternative, it is too complicated.

The test sound can be emitted simultaneously with the useful sound (for example, during a piece of music), the test sound becoming inaudible as a result of the so-called masking effect of the useful sound.

For background information on the nature of the psychoacoustic masking, reference is made to the "Psychoacoustics" Textbook by E. Zwicker, Springer Publishers, 1982, particularly Pages 35, and on, and Pages 94, and on.

In one embodiment of the invention, the masking range of the useful sound is determined in a useful-sound analysis block. A test sound is then defined which is adapted for the determined masking range, before the useful sound and the test sound are emitted. For example, within a piece of music, as a function of individual sections of the piece of music (the useful sounds), for example, with particularly wide covering ranges, several test sounds are emitted several times.

By means of the invention, the spatial characteristics, and thus the spatial transmission characteristics, are dynamically adaptively determined and compensated. This takes place by means of arbitrarily frequent test sound emission during a useful sound playback which can take place by the selection of the respective test sound in the inaudible range.

Also, as a result of the invention, simultaneous compensation of dispersions of the electroacoustic components (such as the loudspeaker, the microphone, the transducer or the amplifier) is possible.

Other objects, advantages and novel features of the present invention will become apparent from the following detailed description of the invention when considered in conjunction with the accompanying drawings.

DETAILED DESCRIPTION OF THE DRAWINGS

Figure 1:
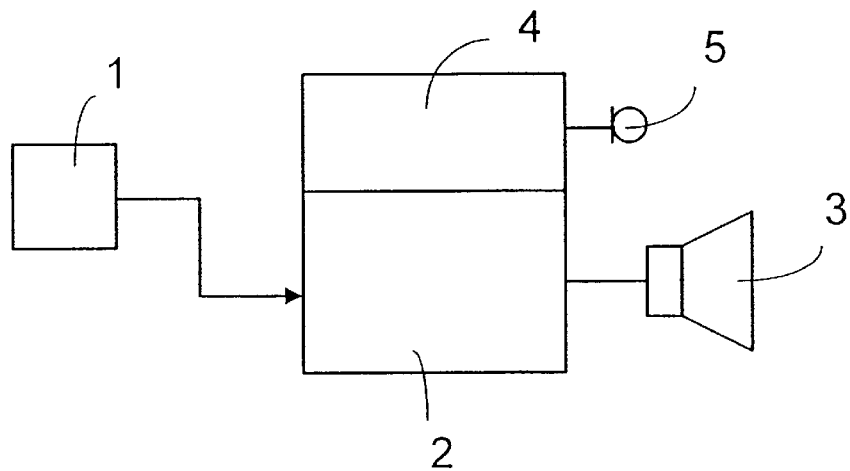
FIG. 1 is a conceptual block diagram of a system for implementing the method according to the invention.

FIG. 1 illustrates, for example, a handsfree telephone system or a CD player in a motor vehicle as a piece of equipment 1 emitting a useful sound. From the piece of equipment 1, the useful-sound signal is first sent to a useful-sound analysis block 2. In the useful-sound analysis block 2, the psychoacoustic covering range, particularly the aftercovering range (FIG. 2) and/or the simultaneous covering range (FIG. 3) of the (audible) useful sound is determined which results from the (first digital or analog electric) useful-sound signal.

Subsequently, the test sound (T; TS) is defined in at least one of the two determined covering ranges (6, FIG. 2; 7, FIG. 3), which test sound preferably consists of orthogonal excitation sequences. The selection of the test sound in the covering range is essential to the invention; that is, in a frequency range and/or in a level range which is inaudible to the human ear because of the masking effect of the useful sound.

The covering range of the useful sound is determined in the useful-sound analysis block 2, before the useful sound and the test sound are emitted; that is, the useful sound emitted by the piece of equipment 1 (together with the test sound) is emitted in a delayed manner by the useful-sound analysis block 2 to the loudspeaker 3.

For determining the acoustic spatial characteristics of the vehicle occupant compartment, the thus defined test sound is emitted from the useful-sound analysis block 2 by way of the loudspeaker 3 together with the useful sound into the vehicle occupant compartment. Subsequently, the analysis sound is recorded by means of a microphone 5, which may, for example, be the handsfree microphone, which is present anyhow, or an additional reference microphone, and analyzed in the test sound analysis block 4. Although the analysis sound contains both the reflected useful sound and the reflected test sound, as a result of the connection of the useful-sound analysis block 2, which emits the useful sound and the test sound, with the test sound analysis block 4, the test source can be isolated and considered separately. The special analysis takes place by a corresponding comparison of the emitted test sound with the recorded test sound, for example, similar to known correlation techniques. As a result, the spatial characteristics can be determined in the form of a spatial transmission function and can be taken into account during the further playback of the useful sound.

The useful-sound analysis block 2 and the test sound analysis block 4 can also be integrated in the piece of equipment 1.

Figure 2:
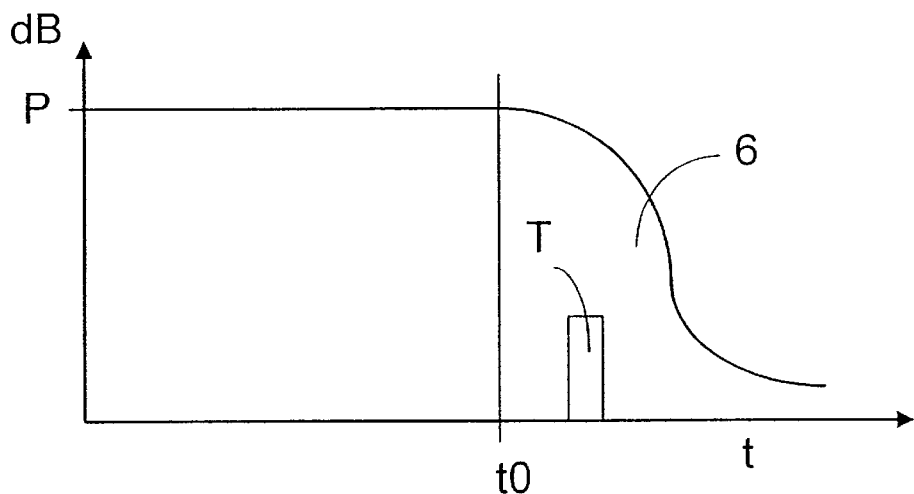
FIG. 2 is a graphic depiction of a test sound in the aftercovering range according to the method of the invention.

In FIG. 2, the time t is plotted on the abscissa and the sound level (in dB) is plotted on the ordinate. Until the point in time t0, a useful sound or a useful-sound signal, such as a section of a piece of music, is played back by the piece of equipment 1 (FIG. 1) at a medium level P. At the point in time t0, a pause follows. In the pause range (t>t0), the sound level of the aftercovering range 6 is illustrated. In this aftercovering range 6, the test sound T is defined which particularly has a level that is below the level of the sound signal in aftercovering range 6.

Figure 3:
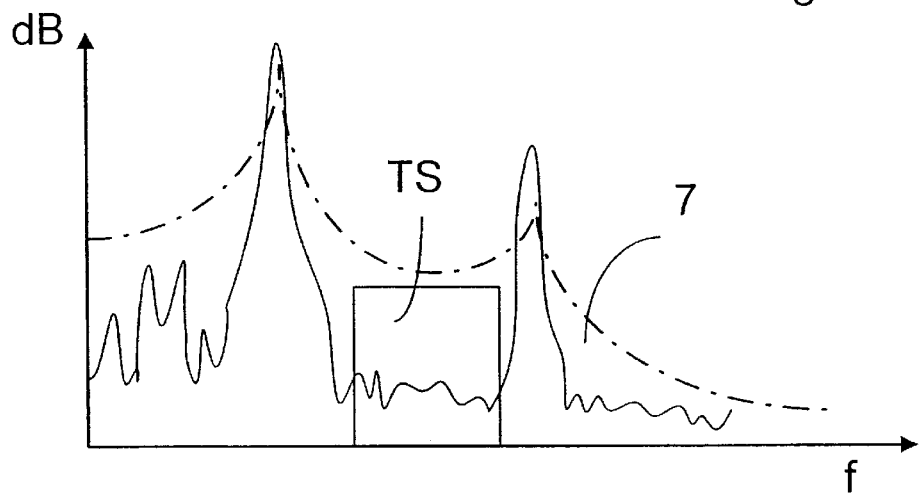
FIG. 3 shows a test sound in the simultaneous covering range according to the method of the invention.

In FIG. 3, the frequency f is shown on the abscissa and the sound level (in dB) on the ordinate. The useful sound in this example has two frequencies with comparatively high levels which define the dash-dotted simultaneous covering range 7. In this case, the test sound is formed, for example, of a broad-band noise-type test signal (TS) which has a level below that of the simultaneous covering range 7 but above the level of the useful sound.

Thus, in the above-mentioned embodiments, both the test sound T according to FIG. 2 and the test sound TS according to FIG. 3 are in a momentarily inaudible range of the human ear, so that the useful sound can be emitted simultaneously with the test sound. However, on the other hand, the test sound has a sufficiently high level to be utilized for dynamic determination of the spatial characteristics according to the method of the invention.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Method for determining acoustic spatial characteristics in a defined space, comprising:
    a piece of equipment emitting a useful sound in said defined space, said useful sound containing aurally detectable information;
    said piece of equipment emitting a test sound in said defined space, concurrently with emission of said useful sound;
    detecting and recording an analysis sound comprising said useful sound and said test sound; and
    analyzing said analysis sound;
    wherein the test sound is emitted within a psychoacoustic masking range of the useful sound.

2. The method according to claim 1, wherein the psychoacoustic masking range of the useful sound is determined in a useful-sound analysis block before the useful sound and the test sound are emitted.

3. The method according to claim 1, wherein said defined space is a vehicle passenger compartment.

4. Apparatus for determining acoustic spatial characteristics in a defined space, said apparatus comprising:
    a device for emitting in said defined space a useful sound containing aurally detectable information;
    a device for determining a psychoacoustic masking range of said useful sound;
    apparatus for emitting a test sound in said defined space, concurrently with emission of said useful sound, said test sound falling within said psychoacoustic masking range; and;
    apparatus for detecting, recording and analyzing an analysis sound comprising said useful sound and said test sound.

5. The apparatus according to claim 4, wherein a useful-sound analysis block is provided which determines the psychoacoustic masking range of the useful sound before the useful sound and the test sound are emitted.

6. The apparatus according to claim 4, wherein said defined space is a vehicle passenger compartment.

7. A method for determining acoustic spatial response characteristics in a defined space, to useful sound that is generated by a sound generating apparatus and contains aurally detectable information, said method comprising:
    analyzing said useful sound to determine a psychoacoustic masking range thereof;
    causing said sound generating apparatus to emit a test signal within said psychoacoustic masking range, together with the useful sound, said test signal being inaudible to human perception;
    detecting sound generated by said sound generating apparatus, including said useful sound and said test signal; and
    analyzing detected sound to determine said acoustic spatial response characteristics.

8. The method for determining acoustic spatial response characteristics in a defined space according to claim 7, wherein said step of analyzing comprises:
    separating said test signal from said useful sound; and
    analyzing said test signal separately.

9. Apparatus for determining acoustic spatial response characteristics of a defined space, to a useful sound that is generated by a sound generating apparatus and contains aurally detectable information, said method comprising:
    a transducer for detecting sound generated by said sound generating apparatus;
    a sound analysis block coupled to receive an output of said transducer, for analyzing detected sound, said sound analysis block containing apparatus for determining a psychoacoustic masking range of said useful sound;
    apparatus for causing said sound generating apparatus also to generate a test signal within said psychoacoustic masking range, together with said useful sound, said test signal being inaudible to human perception;
    means for separating said test signal from said useful sound contained in an output of said transducer; and
    means contained in said sound analysis block for analyzing said test signal to determine said acoustic spatial response characteristics.

* * * * *